US007730307B2

(12) United States Patent
Viggiano et al.

(10) Patent No.: US 7,730,307 B2
(45) Date of Patent: Jun. 1, 2010

(54) SECURE ADS-B AUTHENTICATION SYSTEM AND METHOD

(75) Inventors: Marc J Viggiano, Manlius, NY (US); Edward M Valovage, Memphis, NY (US); Kenneth B Samuelson, Fayetteville, NY (US); Dana L Hall, Skaneateles, NY (US)

(73) Assignee: Sensis Corporation, East Syracuse, NY (US)

( * ) Notice: Subject to any disclaimer, the term of this patent is extended or adjusted under 35 U.S.C. 154(b) by 1090 days.

(21) Appl. No.: 11/401,017

(22) Filed: Apr. 7, 2006

(65) Prior Publication Data

US 2007/0239986 A1    Oct. 11, 2007

(51) Int. Cl.
*H04L 9/00* (2006.01)
(52) U.S. Cl. ..................................... 713/168
(58) Field of Classification Search .................. 713/168
See application file for complete search history.

(56) References Cited

U.S. PATENT DOCUMENTS

| 5,539,826 | A | 7/1996 | Dwork et al. ............... 713/169 |
| 6,463,154 | B1 | 10/2002 | Patel ......................... 380/270 |
| 6,760,778 | B1 | 7/2004 | Nelson et al. .............. 709/246 |
| 2002/0120584 | A1* | 8/2002 | Hogan et al. ................. 705/67 |
| 2003/0021417 | A1 | 1/2003 | Vasic et al. ................. 380/277 |
| 2003/0177094 | A1 | 9/2003 | Needham et al. .............. 705/50 |
| 2004/0086121 | A1* | 5/2004 | Viggiano et al. ............ 380/255 |

OTHER PUBLICATIONS

NIST. "The Keyed-Hash Message Authentication Code." Mar. 6, 2002.*
Samuelson, K. et al., "Enhanced ADS-B Research", Aerospace Conference, 2006 IEEE Big Sky, MT, USA, Mar. 4, 2006, pp. 1-7.
Donovan, Todd A., "Concept for an Integrated National Surveillance and Data Communication Infrastructure", Aerospace Conference, 2006 IEEE Big Sky, MT, USA, Mar. 4, 2006, pp. 1-14.
Van Sickle, Garth A., "Aircraft Self Reports for Military Air Surveillance", Digital Avionics Systems Conference, 1999 Proceedings, 18$^{TH}$ St. Louis, MO, vol. B.5/12, vol. 2 , Oct. 24, 1999, pp. 6D2.1-6D2.7.
Bellare, M. et al., "Message authentication using hash functions—the HMAC construction", Cryptobytes, RSA Laboratories, US, vol. 2, No. 1, 1996, pp. 12-15.
Tu, Kwei, "An ID-Based Cryptographic Technique for IFF", Military Communications Conference, 1995, Milcom '95, Conference Record, IEEE SanDiego, CA, USA, Nov. 5, 1995, vol. 3, pp. 1258-1262.

* cited by examiner

*Primary Examiner*—Nasser Moazzami
*Assistant Examiner*—Lisa Lewis
(74) *Attorney, Agent, or Firm*—Durr & Brown

(57) ABSTRACT

A secure system for authenticating the identity of ADS-B systems, including: an authenticator, including a unique id generator and a transmitter transmitting the unique id to one or more ADS-B transmitters; one or more ADS-B transmitters, including a receiver receiving the unique id, one or more secure processing stages merging the unique id with the ADS-B transmitter's identification, data and secret key and generating a secure code identification and a transmitter transmitting a response containing the secure code and ADSB transmitter's data to the authenticator; the authenticator including means for independently determining each ADS-B transmitter's secret key, a receiver receiving each ADS-B transmitter's response, one or more secure processing stages merging the unique id, ADS-B transmitter's identification and data and generating a secure code, and comparison processing comparing the authenticator-generated secure code and the ADS-B transmitter-generated secure code and providing an authentication signal based on the comparison result.

28 Claims, 3 Drawing Sheets

Secure ADS-B Authentication System

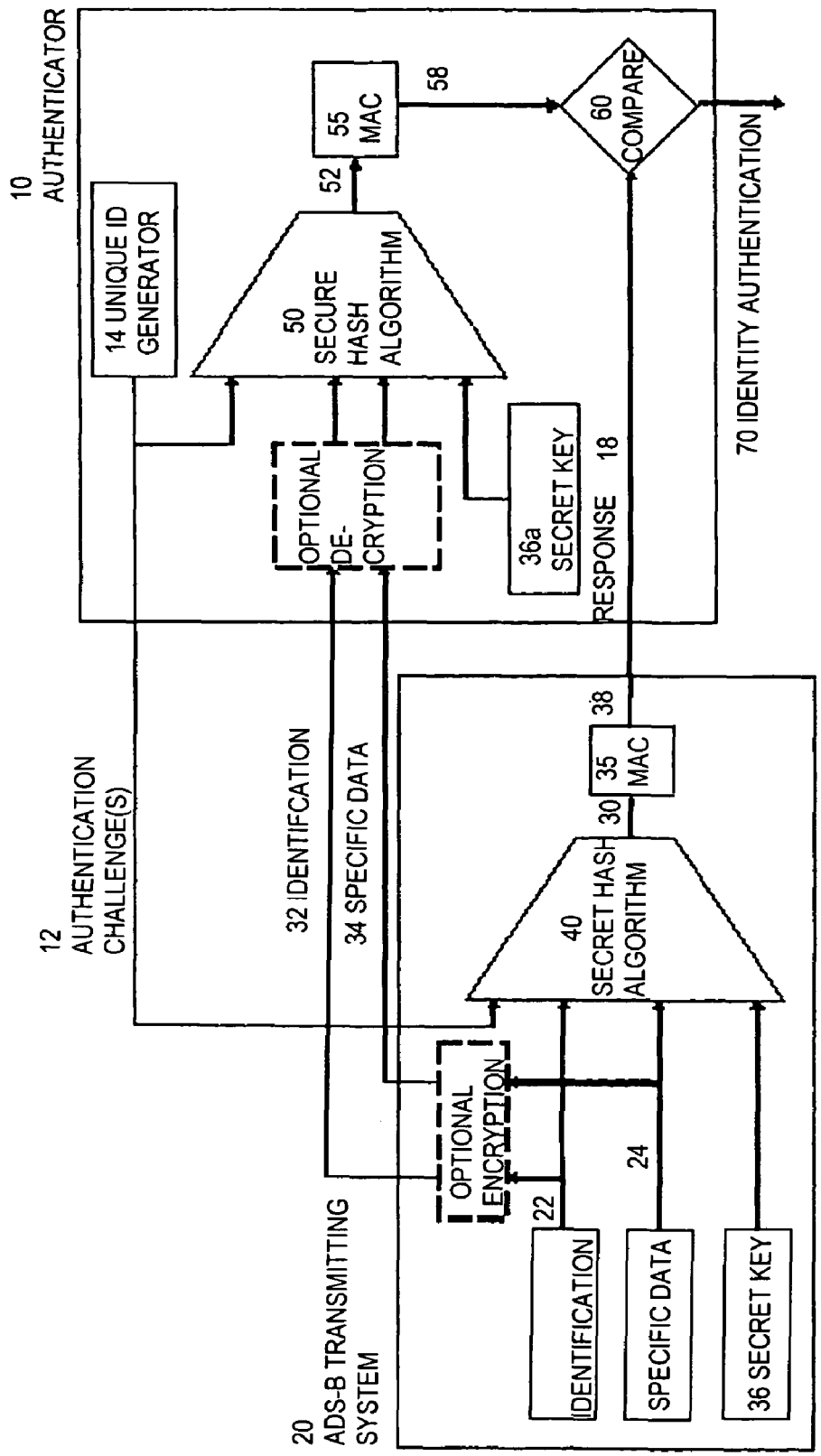
Fig. 1 - Secure ADS-B Authentication System

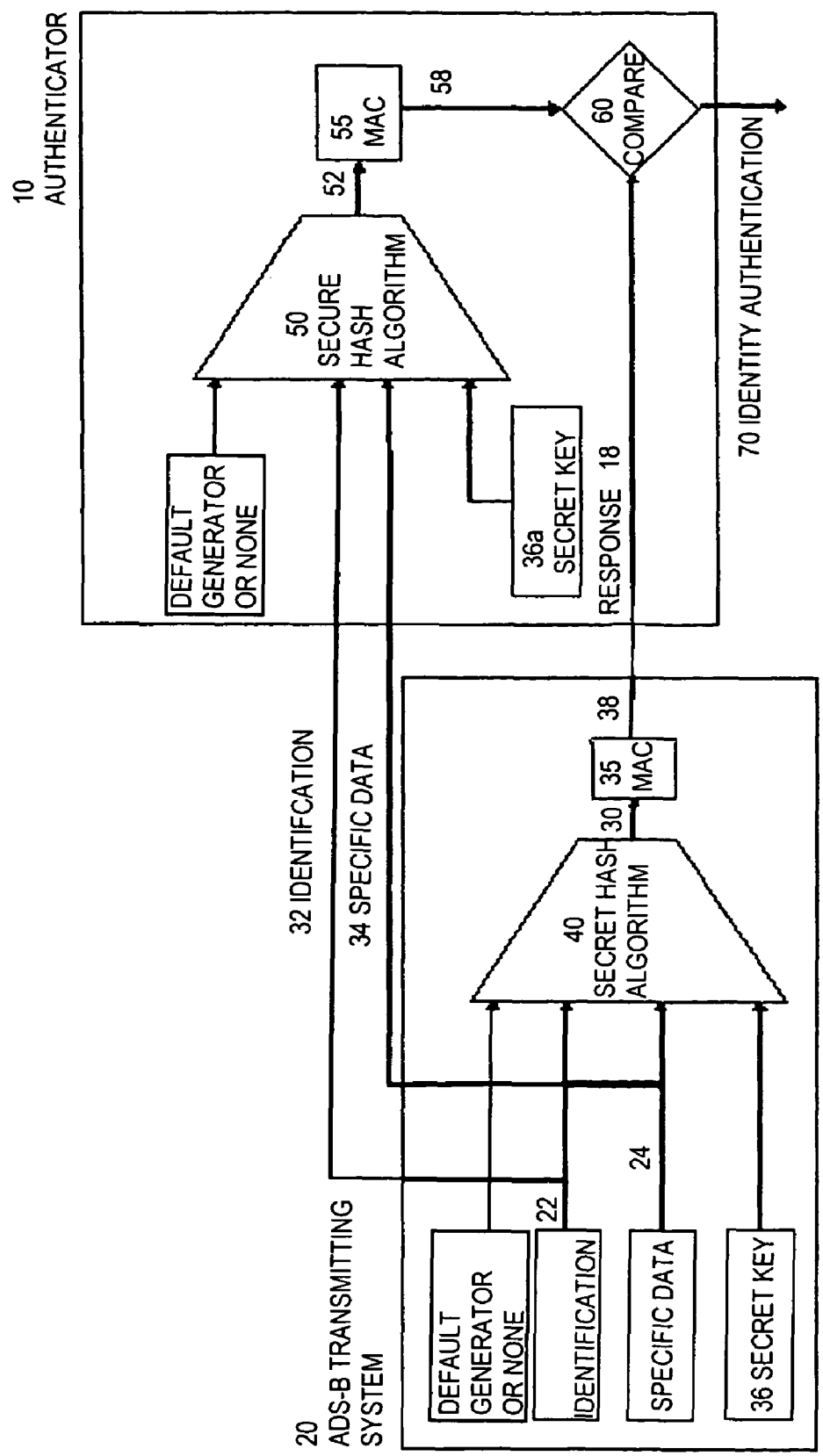
Fig. 2 - Unsolicited ADS-B Authentication System

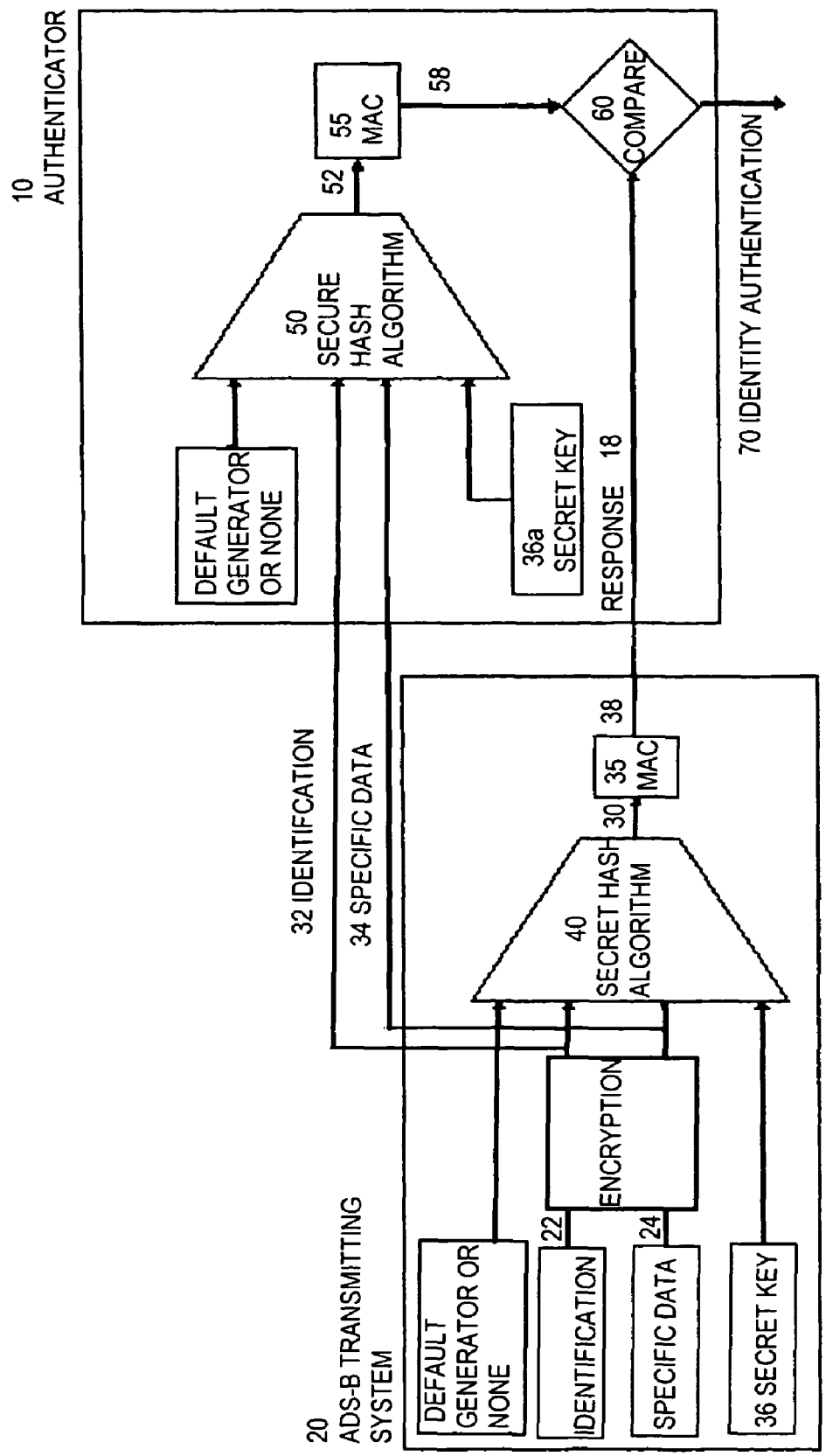
Fig. 3 - Encrypted Secure ADS-B Authentication System

SECURE ADS-B AUTHENTICATION SYSTEM AND METHOD

The Government of the United States of America has rights in this invention pursuant to Cooperative Agreement NNC05AA02A, awarded by the National Aeronautic and Space Administration (NASA).

CROSS REFERENCE TO RELATED APPLICATION

This application is related to U.S. patent application Ser. No. 10/285,070 filed Oct. 31, 2002, the entirety of which is incorporated herein by reference.

FIELD OF THE INVENTION

The present invention relates to the general area of ADS-B (Automatic Dependent Surveillance-Broadcast, a field of aviation surveillance) and in particular to a method and apparatus for securely authenticating aircraft identity from unencrypted or encrypted broadcast ADS-B position report message (hereinafter ADS-B message) data, providing enhanced security in an airspace.

BACKGROUND OF THE INVENTION

ADS-B is a technology that is being developed and deployed around the world to enhance aviation safety by allowing aircraft to make accurate and timely reports of their position, velocity, identification, capability, and intentions. The current ADS-B message protocol lacks any identity authentication scheme and ADS-B data is currently broadcast without encryption or other security measures. In addition, the current direction in air traffic control is to rely on the ADS-B message data for the control and management of air traffic. This leaves the current ATC system vulnerable to broadcast of false identification data.

What is needed is a method of authenticating an aircraft's identity, thereby making it more difficult for unauthorized third parties to enter a given air traffic control region by broadcasting false identification data for an aircraft, without adversely affecting the data throughput of the air traffic control system.

This invention addresses these problems by employing cryptographic techniques as part of an authentication scheme to enhance the security of the ADS-B system.

SUMMARY OF THE INVENTION

One embodiment of the secure authentication ADS-B system and method of this invention requires ADS-B systems to respond to authentication challenges, verifying the identity of the ADS-B systems using an authentication challenge-response format. In this embodiment, the method for securely authenticating identity between an authenticator system and an ADS-B transmitter system includes the steps of: generating a unique identifier at the authenticator system; transmitting an authentication challenge containing the unique identifier to the ADS-B transmitter system; generating a secure output by inputting the received unique identifier, the ADS-B transmitter system's specific data, ID and secret-key into a secure process at the ADS-B transmitter's system; generating a secure code by inputting the ADS-B transmitter-generated secure output into a second secure process; transmitting the ADS-B transmitter-generated secure code, the ADS-B transmitter's specific data and ID to the authenticator's system; receiving the ADS-B transmitter's transmitted response containing the ADS-B transmitter-generated secure code, specific data and ID; the authenticator independently determining the ADS-B transmitter system's secret-key; generating a secure output by inputting the unique identifier, the ADS-B transmitter's specific data, ID and secret-key in secure processing at the authenticator; generating a secure code by inputting the requestor-generated secure output into a second secure process; comparing the authenticator-generated secure code and the ADS-B transmitter-generated secure code using comparison processing; and authenticating the ADS-B transmitter's identity by determining that the authenticator-generated secure code and the ADS-B transmitter-generated secure code are the same.

The secure authentication ADS-B system and method of the present invention overcomes the authentication vulnerability of an airspace by providing a means for authenticating ADS-B equipped platform's identity.

BRIEF DESCRIPTION OF THE DRAWINGS

FIG. 1 is a block diagram of a secure ADS-B authentication system in accordance with one embodiment of the present invention.

FIG. 2 is a block diagram of an unsolicited ADS-B authentication system in accordance with a second embodiment of the present invention.

FIG. 3 is a block diagram of an encrypted ADS-B authentication system in accordance with a third embodiment of the present invention.

DETAILED DESCRIPTION OF THE INVENTION

The authentication apparatus of the present invention includes an ADS-B system and secure processing including memory for loading and storing an ADS-B equipped platform's secret key. The authentication apparatus of the authentication challenging system further includes a unique identifier generator and identity authentication processing including comparison processing for comparing the independently generated authentication codes. In one embodiment of the present invention, the authentication system includes a user interface to enter a pilot's personal identification number (PIN). In another embodiment, the authentication challenging system and ADS-B transmitter system also include an encryption system to encrypt and decrypt the ADS-B broadcast position message(s) (hereinafter ADS-B message).

One embodiment of the authentication apparatus and method of the present invention employs an authentication challenge-response methodology and encryption techniques to authenticate the identity of an ADS-B equipped aircraft, vehicle or station, as shown in FIG. 1. It should be noted that data paths to air traffic control systems and aircraft flight systems, for example, are not depicted in FIGS. 1-3. In operation, each aircraft transiting through an airspace is broadcasting its specific position data 24 and a unique ID 22, for example, a Mode S address. The authentication challenge 12 is transmitted from an ADS-B equipped aircraft, vehicle, vessel or ground station (hereinafter Authenticator). This invention applies an authentication scheme and optional encryption to provide greater assurance that an ADS-B equipped aircraft, vehicle, vessel or station (hereinafter ADS-B transmitter) is who it says it is. In one embodiment of the present invention, each aircraft is broadcasting its ID 22 and specific data 24 in an unencrypted form. In another embodiment of the present invention, the authentication challenge 12 is transmitted from a ground station as part of the uplink data. The unique identifier is a data field generated by unique identifier generator 14 that is part of the system of the Authenticator 10.

In one embodiment of the present invention, the unique identifier generator 14 comprises a random number generator. While the unique identifier can be random values, it need only be unique so that an attacker cannot "learn" a valid response by observing the challenges 12 of the authenticator and the corresponding responses 38. The Authenticator's system generates a unique identifier and transmits an authentication challenge 12, which includes the unique identifier to the ADS-B transmitter 20. The ADS-B transmitter 20 inputs the unique identifier, the ADS-B transmitter's ID 22 and specific data 24 into the authentication processing to generate its authentication challenge response. The ADS-B transmitter's specific data 24 may include such data as position, velocity, and intent as might be provided by a flight management system. In one embodiment of the present invention, the authentication processing of the ADS-B transmitter system comprises a secret-key 36, a secure hash generator 40 and a Message Authentication Code (MAC) generator 35, which transform the input data into a MAC 38. The MAC 38, the ADS-B transmitter's ID 22 and the ADS-B transmitter's specific data 24 are then transmitted to the Authenticator 10 in an authentication response 18.

In one preferred embodiment of the present invention, the MAC 38 is transmitted as part of a 1090 MHz ADS-B message using unused and/or reserved bits in the ADS-B 1090 MHz broadcast message format. In another preferred embodiment, the MAC 38 is transmitted in response to an authentication challenge 12 as part of the ADS-B UAT broadcast position message, using unused and/or reserved bits in the ADS-B UAT message format. The ADS-B UAT broadcast position message is broadcast approximately every second by ADS-B UAT equipped aircraft and vehicles. Authenticator 10 may receive an ADS-B transmitter's ID 22 and specific data 24 after transmitting the authentication challenge 12.

When the Authenticator 10 receives the ADS-B transmitter's authentication response 18, in either encrypted or unencrypted form, the Authenticator 10 inputs the locally generated unique identifier, with the received ADS-B transmitter's ID 32, and specific data 34 and the secret-key 36a into a secure hash generator 50, to generate an Authenticator-generated secure hash value 52. The secure hash value 52 is input into the MAC generation processing 55 to generate an Authenticator-generated MAC 58. The Authenticator's system applies the received ADS-B transmitter-generated MAC 38 and the Authenticator-generated MAC 58 to comparator 60 to authenticate the ADS-B transmitter's 20 identity. If the MAC 38 received from the ADS-B transmitter 20 matches the Authenticator-generated MAC 58, an authentication signal 70 is produced indicating that the identity of the ADS-B transmitter is authenticated. In one embodiment of the present invention, if an ADS-B transmitter 20 fails two or more consecutive authentication response comparisons, the Authenticator 10 notifies a responsible higher command authority of the authentication failures, so that the responsible higher command authority can respond appropriately. In another embodiment, the Authenticator 10 issues an alert that is displayed to other ADS-B equipped aircraft, vehicles, vessels or stations.

In one embodiment of the present invention, an Authenticator 10 issues a broadcast authentication challenge 12 to ADS-B equipped platforms each broadcast cycle and the ADS-B equipped platforms authentication challenge response 18 is transmitted in the corresponding transmission cycle. In a preferred embodiment, the authentication challenge 12 is broadcast in a newly-defined uplink format and the authentication response 18 is broadcast as part of the Mode S ADS-B message, using unused and/or reserved bits in Mode S ADS-B message. In another preferred embodiment, the authentication challenge 12 is broadcast as part of a UAT Ground Uplink and the authentication response 18 is broadcast as part of the ADS-B UAT broadcast position message, using unused and/or reserved bits in ADS-B UAT message. In another embodiment of the present invention, an Authenticator 10 issues addressed authentication challenges 12 to one or more ADS-B equipped platforms each broadcast cycle and each ADS-B transmitter system's authentication challenge response 18 is transmitted in the corresponding transmission cycle.

This secure ADS-B technique does not depend on any one specific secure hash algorithm. Some secure hash algorithms have response hashes that are longer than the standard ADS-B message size The secure hash generators, 40 and 50, contain a secure hash algorithm, which may be implemented in hardware or software and generate a secure hash value, 30 and 52, as its output. However, according to the present invention the secure hash value, 30 and 52, is input into the second secure process, which includes the MAC generator, 35 and 55, that modifies, reduces, and/or truncates the secure hash value to generate the MAC, 38 and 58. The ADS-B transmitter 20 transmits MAC 38 to the Authenticator 10 in its authentication response 18 to the Authenticator's authentication challenge 12. In one embodiment of the present invention, a MAC, 38 and 58, for example, contains a designated 16-bit or 8-bit block from the secure hash value, 30 and 52.

Although the application of a MAC generator, 35 and 55, reduces the power of the long secure hash value, it is impractical for an attacker to correctly guess the MAC and limiting the size of the MAC 38 to a designated subset of bits alleviates the impact of the authentication scheme of the present invention on the bandwidth of Mode S, UAT or VDL Mode 4, for example. As the Authenticator 10 observes the ADS-B transmitter 20, the strength of the authentication method and confidence in it quickly grows. In one embodiment, the MAC 38 is the last 8-bits of the computed secure hash value 30.

In another embodiment of the present invention, the authentication apparatus and method of the present invention provides identity authentication without using the authentication challenge-response methodology for airspace in which lower levels of security are acceptable. As shown in FIG. 2, each ADS-B equipped aircraft inputs the ADS-B system's specific data 24, ID 22 and secret code 36 into the system's secure processing to generate a secure MAC 38 for transmission in this method of unsolicited identity authentication. In one embodiment the unique authentication challenge identifier is replaced with a default value, such as 0000, for example, in the secure hash algorithm. In another embodiment, a different secure hash algorithm is used that does not have an authentication challenge input and the secure processing operates as described above. In a preferred embodiment, a designated ADS-B system monitors the unsolicited identity authentication contained in the ADS-B messages. The monitoring ADS-B system performs the same processing steps as the ADS-B transmitter to generate the MAC and perform the comparison.

In the authentication scheme of the present invention, an ADS-B transmitter's secret-key 36 must be available to both the ADS-B transmitter 20 and the Authenticator 10. In one embodiment of the present invention, the Authenticator 10 will transmit broadcast authentication challenges 12 to ADS-B transmitters 20 at regular intervals, requiring all ADS-B equipped platforms to respond. In another embodiment of the present invention, the Authenticator 10 will transmit addressed authentication challenges 12 to one or more ADS-B transmitters 20 every reporting cycle (each second for example). In yet another embodiment of the present invention, the Authenticator 10 will transmit broadcast authentication challenges 12 and addressed authentication challenges 12 to one or more ADS-B transmitters 20 at regular intervals.

Since there will be multiple ADS-B transmitters 20 being authenticated during any reporting cycle, it is preferable that each ADS-B transmitter 20 has its own secret-key 36. Each ADS-B transmitter 20 having its own secret-key 36 also helps protect the ADS-B system from a system wide attack. The secret-key 36 can be of any agreed-upon length, and the length maybe varied for military or other unique applications.

The secret key can be composed of a predefined combination of any number of separate key values and thus provide an authentication of any number of individual entities. For example, in one embodiment, a secret key can be composed of the combination of a secret binary number stored in the ADS-B transceiver of an aircraft and a Personal Identification Number (PIN) assigned to the pilot. In this embodiment, the successful authentication check by the authenticator gives an assurance that the ADS-B message came from the aircraft that the message claims it to be from, and that the pilot is the authorized pilot for that flight. In another embodiment, the key can be the combination of the ADS-B transceiver secret binary number and the pilot PIN as in the last embodiment plus an additional PIN entered by a cargo dispatcher certifying that the cargo has had the required screening. Additional PINs can be supplied by other authorized people monitoring other phases of the flight on the ground or in the air. Additional binary values obtained from other systems on board the aircraft or station transmitting the ADS-B message.

The secret key used by the ADS-B transmitter 20 must be discoverable by the Authenticator 10. In one embodiment, the Authenticator 10 has access to a database of flight plan data, associating a flight with the pilots, aircraft, cargo or passenger dispatcher, or any other authorized people monitoring other phases of the flight on the ground or in the air. The Authenticator 10 can then use this flight plan database along with identifying content of the ADS-B message to determine the pilots, aircraft, cargo or passenger dispatcher, or any other authorized people monitoring other phases of the flight, and to look up in a secure database the corresponding PINs and/or secret binary numbers comprising the secret key. In one specific embodiment for air traffic control, the identifying content of the ADS-B message is the aircraft Mode-S address. In another specific embodiment the identifying content is the Mode 3/A code.

In one embodiment, the secure hash algorithm, 40 and 50, can operate on the ADS-B transmitter ID, 22 and 32, and specific data, 24 and 34, in an unencrypted form, as shown on FIG. 1. In another embodiment, the secure hash algorithm, 40 and 50, can operate on the ADS-B transmitter ID 32 and specific data 34 in an encrypted form, as shown on FIG. 3. In this case, the Authenticator 10 must use the ADS-B transmitter's ID 32 and specific data 34 in the secure hash algorithm 50, prior to decryption. Note that the determination by the authenticator of the secret key to use, discussed in paragraphs [0021] and [0022], must come from knowledge of the identity of the ADS-B transmitter. If the encryption scheme encrypts this information, it must be decrypted before determining the identity. This process is not elaborated in FIG. 3. In yet another embodiment of the present invention, some aircraft are broadcasting their ID 32 and specific data 34 in an encrypted form and other aircraft are broadcasting their ID 32 and specific data 34 in an unencrypted form.

One requirement for accepting a hash algorithm as sound is that there be no known method of determining the hash without the key that is better than brute force guessing. A hash size of 128 bits has $2^{128}$ possible values and the probability of correctly guessing it is the reciprocal of that number. Although this is a very small probability, in the general field of cryptographic authentication, this is minimally acceptable. In the ADS-B aviation application, broadcasting a 128-bit or larger hash value is impractical due to the small message sizes, but fortunately the probability of guessing the hash value does not have to be extremely low. The reason for this is as follows. In a typical authentication application, an attacker experiences no penalty or risk in making a wrong guess. In addition, one successful guess represents a successful attack (for example, gaining login access to a computer). In our aviation application, the messages with authentication hashes occur one or more times per second as an aircraft flies through a region. An attacker gains little by correctly guessing one of the hashes. All of the hashes must be correct to be authenticated. Additionally, an incorrect hash is immediately obvious and makes the target suspect. For this reason, a much smaller hash, say 8 bits or fewer, is quite acceptable for ADS-B. With each transmitted ADS-B message, the probability of guessing the correct hash for that message and all of the previous ones grows smaller and the strength of the authentication increases.

In one embodiment, the ADS-B transmitter's secure hash value 30 is input into a message authentication code (MAC) generator 35, which generates a message authentication code (MAC) 38 for the ADS-B transmitter 20. The Authenticator 10 inputs its secure hash value 52 into MAC generator 55 to generate its MAC 58. By design, the transmitted MAC 38 contains fewer bits than the associated secure hash value 30. In one embodiment of the present invention, the MAC, 38 and 58 contains a truncated subset of the secure hash value, 30. In another embodiment of the present invention, the MAC, 38 and 58, is generated by using a moving bit pattern of a predetermined length, for example, 8-bits, with the bits selection based on a predetermined sequence, to truncate the MAC generator output. In yet another embodiment, the predetermined bit selection sequence changes at predetermined intervals. In still another embodiment, the MAC, 38 and 58, comprises a predetermined subset of bits that are non-contiguous. In yet an additional embodiment, the number of bits in the predetermined pattern is 8-bits or less.

In one embodiment of the present invention, the authentication challenge 12 unique identifier is 16-bits in length. The ADS-B transmitter specific data 34 may be transmitted as encrypted data or unencrypted data (i.e., sent in-the-clear). The ADS-B transmitter's ID, 22 and 32, is a constant value of constant length. The ADS-B transmitter's specific data 24 and 34 will comprise a segment of allocated bits in a standard ADS-B message. The number of bits comprising the ADS-B transmitter's specific data 24 and 34 is typically defined by international standard. Currently, for example, a Mode-S message contains 112-bits of data and a Universal Access Transceiver (UAT) message contains either 240-bits or 384-bits of data.

While the specification describes the authentication of an aircraft by an authenticator, typically but not necessarily a ground station/authority, the method is equally applicable to authentication of the ground station by an aircraft or other user of information sent from the ground. In one embodiment of the present invention, a ground station transmits a MAC in the uplink message so that transiting aircraft can authenticate the transmitting ground station's identity. In another embodiment of the present invention, transiting aircraft can request authentication of ground stations or vehicles. In this embodiment, the identification, 22 and 32, and specific data, 24 and 34, used in the secure hash algorithm is the ground station ID and designated up-link data, such as weather data, in place of Mode S ID, position, and velocity. The method described herein is valid and useful as long as the data used to authenticate the ground station is predetermined and agreed in advance, and the same data used to generate the MAC, 38 and 58, for comparison 60.

Where an ADS-B transmitter system has not received an authentication challenge, the ADS-B transmitter system generates a MAC using the challenge unique identifier from the most recent received authentication challenge, in one specific embodiment of the present invention. Here, if the ADS-B transmitter's message fails the MAC comparison, the authenticator recomputes the MAC using the last challenge unique identifier for the ADS-B transmitter, thereby reducing false identity authentication comparisons. In another embodiment, the ADS-B transmitter system generates a MAC using a predetermined default value for the challenge unique identifier where the ADS-B transmitter system has not received an authentication challenge. In this case, if the ADS-B transmitter's message fails the MAC comparison, the authenticator recomputes the MAC using the predetermined default value. In yet another embodiment of the present invention, the pilot or operator of the ADS-B transmitter system can turn the authentication system of the present invention ON/OFF.

While the invention has been described in connection with a presently preferred embodiment thereof, those skilled in the art will appreciate that various modifications and changes may be made therein without departing from the true spirit and scope of the invention which is accordingly intended to be limited solely by the appended claims.

We claim:

1. A method for unsolicited identity authentication of an ADS-B system comprising the steps of:
   (a) generating an authentication secure code by inputting said ADS-B transmitter system's specific data, ID and secret-key in secure processing in said ADS-B transmitter system;
   (b) transmitting an ADS-B message comprising said ADS-B transmitter system's specific data, ID and secure code from said ADS-B transmitter system;
   (c) receiving at least one of said ADS-B messages transmitted from said at least one ADS-B transmitter system at an authentication monitoring system;
   (d) determining said at least one ADS-B transmitter system's secret-key independently at said authentication monitoring system;
   (e) generating an authentication secure code by inputting said ADS-B transmitter system's specific data, ID and said ADS-B transmitter system's secret-key in secure processing in said authentication monitoring system;
   (f) comparing said authentication monitoring system-generated secure code and said ADS-B transmitter-generated secure code using comparison processing for each of said at least one ADS-B transmitter system at said authentication monitoring system; and
   (g) authenticating said ADS-B transmitter system's identity where the output of said comparison processing is said authentication monitoring system-generated secure code and said ADS-B transmitter-generated secure code are the same,
      wherein said secure processing at said ADS-B transmitter and said authentication monitoring system further comprises the steps of:

generating a secure data string of given length from a first secure data process wherein said first secure data process is a secure hash algorithm and said output of said first secure data process is a hash value;
   inputting said secure data string of given length into a second secure data process wherein said second secure data process is a message authentication code (MAC) generator and said output of said second secure data process is a MAC; and
   receiving a secure code generated by said second secure data process, wherein said secure code contains fewer bits than said secure data string of given length from said first secure data process and said secure code is 16 bits or less in length.

2. The method of claim 1 further comprising encrypting said ADS-B system specific data and ID prior to transmission.

3. The method of claim 1 wherein said authentication monitoring system is a ground station.

4. The method of claim 1 wherein said authentication monitoring system is an ADS-B equipped aircraft or an ADS-B equipped vessel.

5. A method for securely authenticating identity between an authenticator's system and at least one ADS-B transmitter's system comprising the steps of:
   (a) generating a unique identifier at said authenticator's system;
   (b) transmitting an authentication challenge containing said unique identifier to said at least one ADS-B transmitter's system;
   (c) generating an authentication secure code by inputting said received unique identifier, ADS-B transmitter system's specific data, ID and secret-key in secure processing in said at least one ADS-B transmitter's system;
   (d) transmitting an authentication challenge response comprising said ADS-B transmitter-generated secure code, said ADS-B transmitter specific data and ID from said at least one ADS-B transmitter's system to said authenticator's system;
   (e) receiving said authentication challenge response transmitted from said at least one ADS-B transmitter's system at said authenticator's system;
   (f) determining said at least one ADS-B transmitter system's secret-key independently;
   (g) generating an authentication secure code by inputting said unique identifier, said ADS-B transmitter system's specific data, ID and said ADS-B transmitter system's secret-key in secure processing in said authenticator's system;
   (h) comparing said authenticator-generated secure code and said ADS-B transmitter-generated secure code using comparison processing for each of said at least one ADS-B transmitter system; and
   (i) authenticating said ADS-B transmitter system's identity where the output of said comparison processing is said authenticator-generated secure code and said ADS-B transmitter-generated secure code are the same,
      wherein said secure processing at said ADS-B transmitter system and said authenticator system further comprises the steps of:
      generating a secure data string of given length from a first secure data process wherein said first secure data process is a secure hash algorithm and said output of said first secure data process is a hash value,
      inputting said secure data string of given length from said first secure data process into a second secure data process wherein said second secure data process is a message authentication code (MAC) generator and said output of said second secure data process is a MAC; and receiving a secure code generated by said second secure data process, wherein said secure code contains fewer bits than said secure data string of given length from said first secure data process and said secure code is 16 bits or less in length.

6. The method of claim 5 further comprising encrypting said ADS-B transmitter's system data prior to transmission to said authenticator system.

7. The method of claim 6 further comprising inputting said ADS-B transmitter's system data to said secure data process prior to decryption by said authenticator system, wherein said ADS-B transmitter's system data is encrypted prior to being input into said secure process at said ADS-B transmitter system.

8. The method of claim 6 further comprising inputting said ADS-B transmitting system data to said secure data process after decryption at said authenticator system, wherein said ADS-B transmitter's system data is input into said secure process at said ADS-B transmitter system prior to being encrypted.

9. The method of claim 5 wherein determining said at least one ADS-B transmitter system's secret-key comprises generating said secret-key by inputting at least one of flight ID, personal identification number (PIN) of assigned pilot or other authorized personnel and said ADS-B transmitter system's mode S address into a key generation algorithm.

10. The method of claim 5 wherein determining said at least one ADS-B transmitter system's secret-key comprises a database look-up of said secret key.

11. The method of claim 5 wherein said second secure process further comprises the steps of: selecting a subset of bits from said secure data string of given length output by said first secure process using a selection of bits that changes for each message according to a predetermined pattern of bit selection.

12. The method of claim 11 further comprising: changing said predetermined pattern of bit selection automatically at predetermined intervals.

13. The method of claim 5 wherein said second secure process further comprises the steps of: selecting a predetermined subset of contiguous or non-contiguous bits from said secure data string of given length output from said first secure process.

14. The method of claim 5 further comprising outputting said secure code of any length equal to or less than the secure hash algorithm output.

15. A method for secure authentication between two or more ADS-B equipped systems comprising:

(a) generating a unique identifier in a unique identifier generator in an authenticator system;

(b) communicating said unique identifier in an authentication challenge from said authenticator system to one or more ADS-B transmitter systems;

(c) receiving said authentication challenge containing said unique identifier communicated by said authenticator system at said one or more ADS-B transmitter systems;

(d) inputting data comprising said unique identifier, ADS-B transmitter system specific data, ID and secret data into secure data processing;

(e) receiving a secure representation of said input data from said secure data processing at said ADS-B transmitter system;

(f) communicating said secure representation of said input data and said ADS-B transmitter system's specific data and ID from said one or more ADS-B transmitter systems to said authenticator system;

(g) receiving said secure representation of said input data and said ADS-B transmitter system's specific data and ID communicated by said one or more ADS-B transmitter systems at said authenticator system;

(h) determining said one or more ADS-B transmitter system's secret data independently;

(i) inputting said unique identifier, said ADS-B transmitter system's specific data, ID and secret data for each of said one or more ADS-B transmitter systems into secure data processing of said authenticator system;

(j) receiving a secure representation of said input data from said secure data processing of said authenticator system data for each of said one or more ADS-B transmitter systems;

(k) inputting said authenticator system-generated secure representation of said input data and said ADS-B transmitter system-generated secure representation of said input data for each of said one or more ADS-B transmitter systems into comparison processing at said authenticator system; and (l) authenticating said one or more ADS-B transmitter system's identity where said authenticator system-generated secure representation of said input data and said ADS-B transmitter system-generated secure representation of said input data are the same, wherein said secure data processing at each of said two or more ADS-B equipped systems further comprises the steps of:

generating a secure data string of given length in a first secure data process wherein said first secure data process is a secure hash algorithm and said output of said first secure data process is a hash value;

inputting said secure data string generated by said first secure data process into a second secure data process wherein said second secure data process is a message authentication code (MAC) generator and said output of said second secure data process is a MAC; and generating said secure representation of said input data in said second secure data process from said secure data string of given length, wherein said secure representation of said input data contains fewer bits than said secure data string from said first secure data process and said secure representation of said input data is 16 bits or less in length.

16. The method of claim 15 wherein said ADS-B transmitter system's specific data comprises at least a predetermined subset of the content of an ADS-B message.

17. The method of claim 15 wherein said ADS-B transmitter system's secret data comprises a secret-key.

18. The method of claim 17 further comprising generating said secret-key by inputting at least one of flight ID, personal identification number (PIN) of assigned pilot or other authorized personnel and said ADS-B transmitter system's mode S address into a key generation algorithm.

19. The method of claim 17 wherein determining said at least one ADS-B transmitter system's secret-key comprises a database look-up of said secret key.

20. An ADS-B secure authentication system comprising:
an authenticator system comprising:
- a. means for generating and storing a unique identifier;
- b. means for communicating said unique identifier to one or more ADS-B transmitter systems in an authentication challenge;
- c. means for receiving said one or more ADS-B transmitter systems communication in response to said authentication challenge;
- d. means for determining said one or more ADS-B transmitter system's secret-key;
- e. means for securely processing input data comprising said unique identifier, said ADS-B transmitter system's secret-key, identification (ID) and specific data to generate a secure code for each of said one or more ADS-B transmitter systems;
- f. means for comparing said authenticator system-generated secure code and said ADS-B transmitter system-generated secure code for each of said one or more ADS-B transmitter systems; and
- g. means for authenticating said ADS-B transmitter system's identity where said authenticator system-generated secure code and said ADS-B transmitter system-generated secure code are the same; and
- h. means for communicating a failed authentication comparison;

said one or more ADS-B transmitter systems comprising:
- a. means for receiving said authentication challenge transmitted by said authenticator system;
- b. means for securely processing said received unique identifier, said ADS-B transmitter system's secret-key, identification (ID) and specific data to generate a secure code; and
- c. means for communicating said secure code and said ADS-B transmitter system's identification (ID) and specific data to said authenticator system in response to said authentication challenge, wherein said means for securely processing at said authenticator system and said one or more ADS-B transmitter systems further comprises:
   a first means for securely processing and generating a secure data string of given length from said input data wherein said first means for securely processing is a secure hash generator further comprising a secure hash algorithm and said output of said first means for securely processing is a hash value;
   a second means for securely processing said secure data string of given length output from said first means for securely processing and generating said secure code wherein said second means for securely processing is a message authentication code (MAC) generator and said output of said second means for securely processing is a MAC, and, wherein said secure code contains fewer bits than said secure data string of given length from said first means for securely processing and said secure code is 16 bits or less in length.

21. The system of claim 20 further comprising a means for encrypting said ADS-B transmitter system identification (ID) and specific data prior to transmission to said authenticator system.

22. The system of claim 20 wherein said means for generating said secret-key comprises inputting at least one of flight ID, personal identification number (PIN) of assigned pilot or other authorized personnel and said ADS-B transmitter's mode S address into a key generation algorithm.

23. The method of claim 20 wherein determining said at least one ADS-B transmitter system's secret-key comprises a database look-up of said secret key.

24. The system of claim 20 wherein said second means for securely processing comprises truncating said secure data string of given length output from said first means for securely processing using a selection of bits that changes for each message according to a predetermined pattern of bit selection.

25. The system of claim 24 wherein said second means for securely processing further comprises changing said predetermined pattern of bit selection automatically at predetermined intervals.

26. The system of claim 20 wherein said second means for securely processing comprises selecting a predetermined subset of contiguous or non-contiguous bits from said secure data string of given length output from said first means for securely processing.

27. The system of claim 20 wherein said second means for securely processing comprises generating said secure code by truncating said secure data string of given length output from said first means for securely processing to a different and smaller number of bits.

28. The system of claim 20 wherein said means for communicating said unique identifier to said one or more ADS-B transmitter systems comprises transferring or sending said unique identifier using RF, light, sound, or other medium to send, receive or transfer said data.

* * * * *